(No Model.)
J. M. WRIGHT.
BAKE OVEN.
No. 414,102. Patented Oct. 29, 1889.
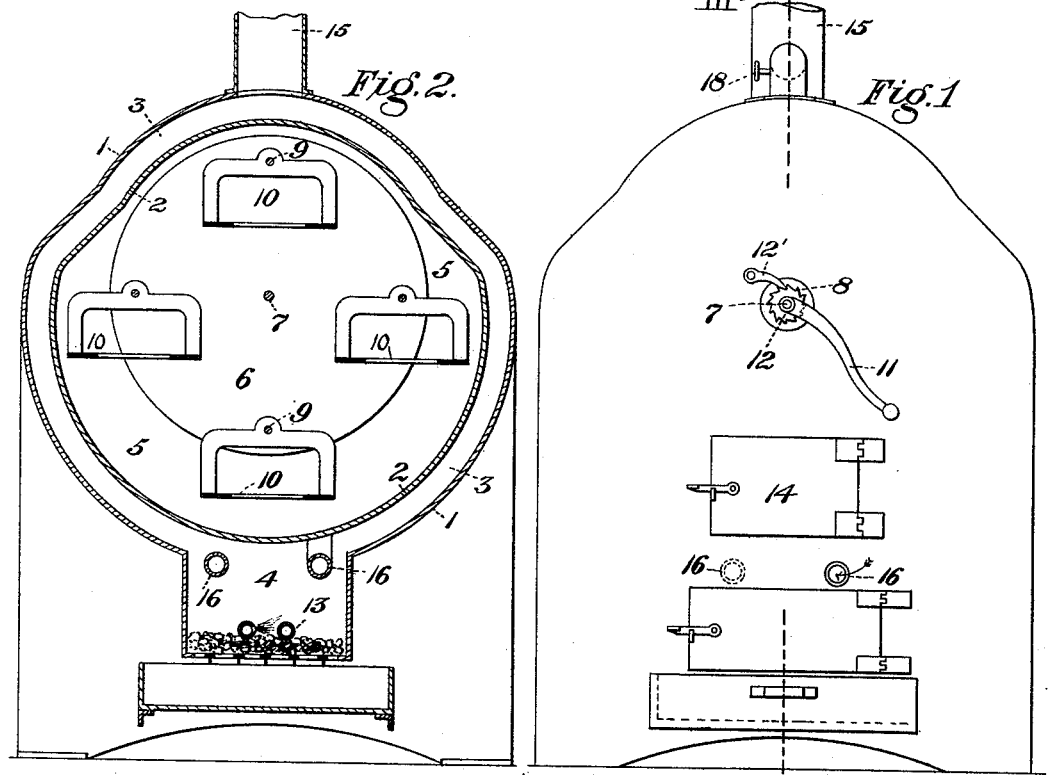
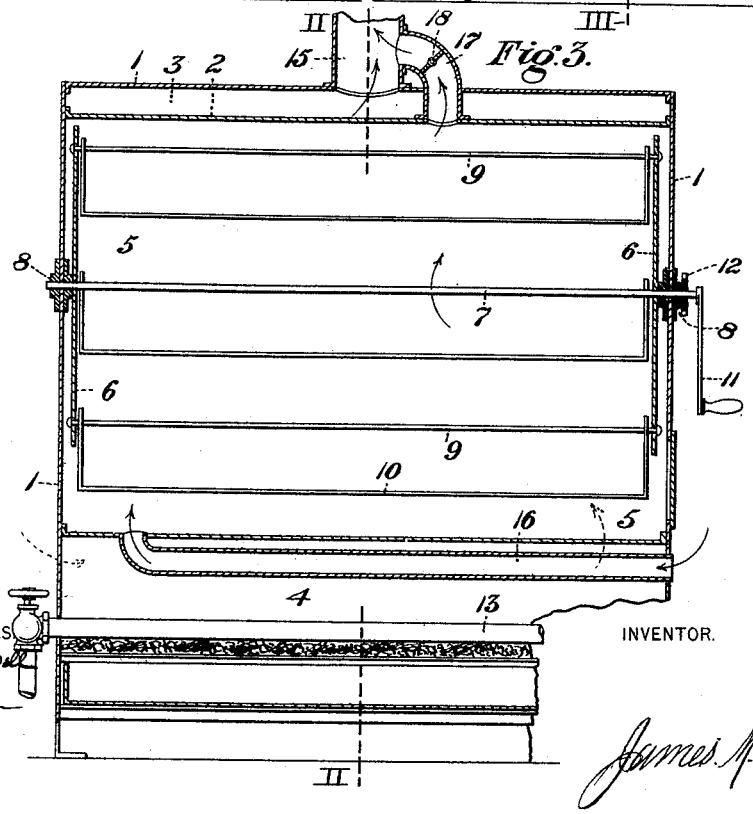
WITNESSES
Thomas W. Bakewell
INVENTOR.
James M. Wright

UNITED STATES PATENT OFFICE.

JAMES M. WRIGHT, OF McKEE'S ROCKS, PENNSYLVANIA.

BAKE-OVEN.

SPECIFICATION forming part of Letters Patent No. 414,102, dated October 29, 1889.

Application filed May 18, 1889. Serial No. 311,328. (No model.)

*To all whom it may concern:*

Be it known that I, JAMES M. WRIGHT, of McKee's Rocks, in the county of Allegheny and State of Pennsylvania, have invented a new and useful Improvement in Bake-Ovens, of which the following is a full, clear, and exact description, reference being had to the accompanying drawings, forming part of this specification, in which—

Figure 1 is a front elevation of my improved oven. Fig. 2 is a vertical cross-section thereof, the section being on the line II II of Fig. 3. Fig. 3 is a vertical longitudinal section on the line III III of Fig. 1.

Like symbols of reference indicate like parts in each.

In the drawings, 1 represents the outside casing or frame of the oven; 2, an inside casing separated from the outer casing by a flue 3; 4, a combustion-chamber at the base of the casing 1; and 15, a smoke flue or stack leading from the flue 3 for the escape of the products of combustion. The baking-compartment 5 is within the casing 2 and contains a rotatory reel or frame, which is composed of end plates 6, secured to an axis 7, which is journaled in bearings 8 at the ends of the outer casing 1.

9 9 are rods connecting the end plates 6, and 10 are bake-pans, which are suspended therefrom. The reel-frame is adapted to be rotated by a crank 11, provided with a ratchet-wheel 12 and pawl 12'.

13 is a perforated U-shaped oil-pipe extending into the combustion-chamber and adapted to supply liquid fuel to be burned therein.

In using the apparatus the bread to be baked is placed in the pans 10 through a door 14 at the end of the casing 1, and the chamber within the casing is heated by igniting the oil in the combustion-chamber, the heated products of combustion of which pass up through the flue 3 around said casing. During the baking of the bread the frame should be partially turned within the baking-chamber to shift the position of the pans and to equalize the heating thereof.

16 16 are pipes which pass through the combustion-chamber from opposite ends and enter the base of the casing 2.

17 is a short flue which extends from the top of the casing 2, preferably into the stack-flue 15, and 18 is a valve or damper controlling the flue 17. If the damper 18 be open, a continual current of air passes through the pipes 16, through the chamber 5, and out of the flue 17, and in passing through the pipes 16 the air becomes heated in such manner that on entering the chamber 5 it shall not reduce the temperature thereof. By entering both ends of the chamber the air-supply is equally distributed throughout the same, and the atmosphere in all parts thereof undergoes renewal.

The employment of the air-supply constitutes the main feature of my invention. Its advantage is that it enables the baking-chamber to be thoroughly ventilated from smoke or offensive gases by opening the valve, and thereby causing a current of air to pass through the same preparatory to baking, and during the baking process the chamber, without reduction of temperature, may be cleared of any dampness, vapors, or smoke which may accumulate therein. For this purpose the valve may be open constantly or opened only occasionally, as may be desired, and by its use I am enabled to employ the oven for baking different articles—such as bread, meat, fruit—at the same time without causing the vapors from one to injuriously affect the others. By properly setting the valve the quantity of air admitted to the chamber may be regulated. The advantage in this regard in improving the quality of the material baked in the oven will be appreciated by those having occasion to use it.

I claim—

The combination of the exterior combustion-chamber 3, the interior baking-chamber 5, the inclosed rotary frame carrying baking-pans, the furnace at the base of the heating-chamber, a flue 15 for the waste products of combustion, air-inlet pipes 16 traversing the combustion-chamber in opposite directions and entering the bottom of the baking-chamber at opposite ends thereof, an outlet-pipe 17 leading from the top of the baking-chamber at or near the middle thereof and entering the said flue 15, and a damper controlling the outlet-pipe 17, substantially as and for the purpose described.

In testimony whereof I have hereunto set my hand this 6th day of April, A. D. 1889.

JAMES M. WRIGHT.

Witnesses:
W. B. CORWIN,
THOMAS W. BAKEWELL.